United States Patent [19]

Miller, deceased

[15] 3,665,465
[45] May 23, 1972

[54] DECELERATION SCHEDULE FOR AIRCRAFT LANDING

[72] Inventor: Justin G. Miller, deceased, late of Los Angeles, Calif. by Rita Ann Miller, administratrix

[73] Assignee: Lear-Siegler, Inc., Santa Monica, Calif.

[22] Filed: Oct. 22, 1969

[21] Appl. No.: 870,008

[52] U.S. Cl. .....................343/7 ED, 235/150.22, 244/77 A, 244/77 D, 343/5 LS
[51] Int. Cl. ......................................B64c 19/00, G06f 7/66
[58] Field of Search ................235/150.2, 150.22; 343/12 A, 343/108, 7 ED, 5 LS; 244/77 A, 77 D

[56] References Cited

UNITED STATES PATENTS

| | | | |
|---|---|---|---|
| 3,519,806 | 7/1970 | Lami et al. | 235/150.22 |
| 3,489,378 | 6/1970 | Watson et al. | 244/77 A |
| 3,280,310 | 10/1966 | Montooth | 235/150.22 |
| 3,463,422 | 8/1969 | Watson | 244/77 A |
| 3,523,664 | 8/1970 | Doniger et al. | 343/108 X |

Primary Examiner—Malcolm F. Hubler
Attorney—Harold L. Jackson, Stanley R. Jones, Robert M. Vargo and Eric T. S. Chung

[57] ABSTRACT

An aircraft guidance system for generating a speed reduction schedule during deceleration along a known descent angle. Radar-sensed altitude along the descent angle is used to produce a signal representative of the aircraft's range to touchdown. The derived range signal is used to command a controlled speed reduction as range to touchdown decreases.

23 Claims, 4 Drawing Figures

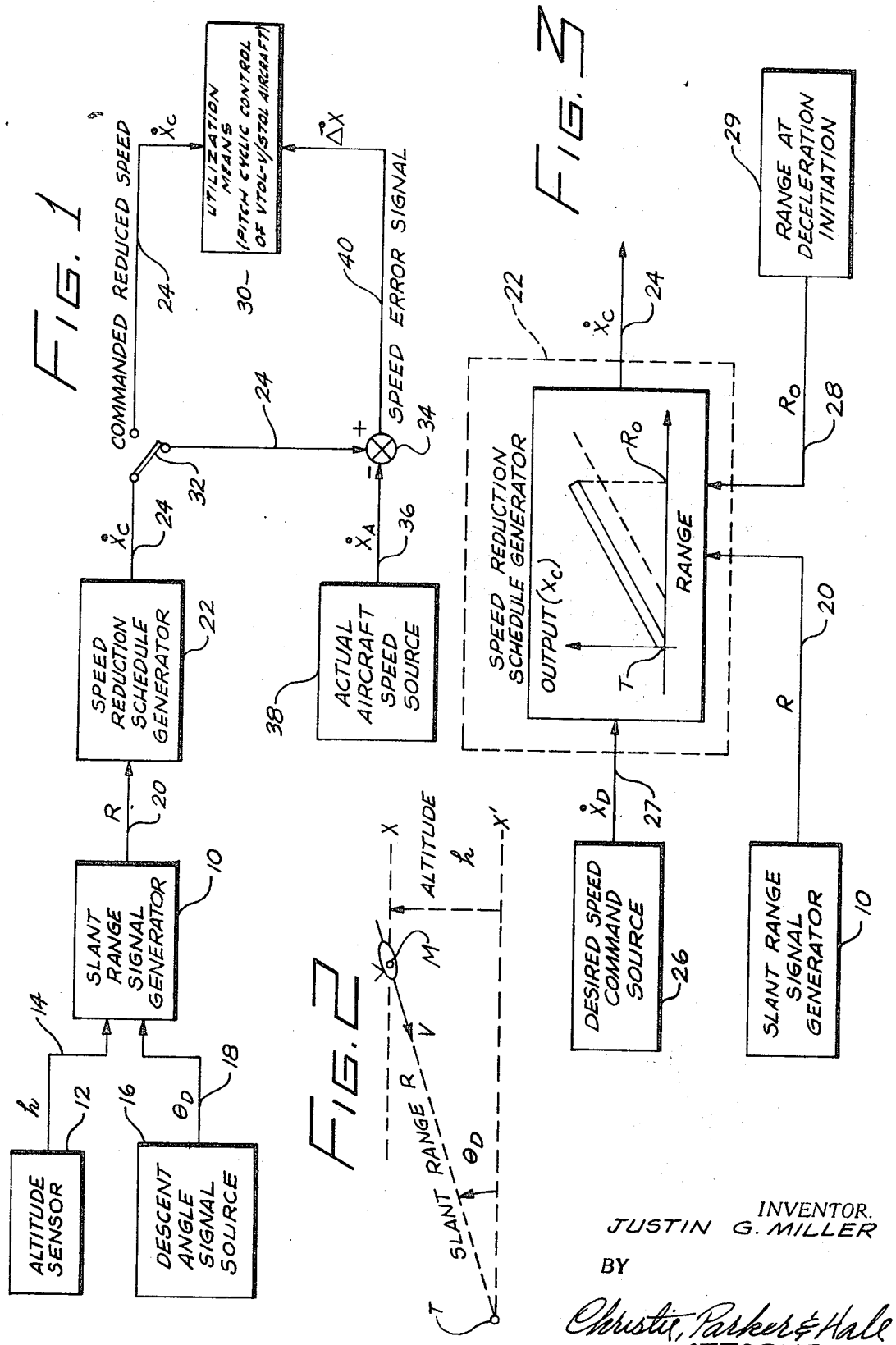

DECELERATION SCHEDULE FOR AIRCRAFT LANDING

BACKGROUND OF THE INVENTION

1. Field of the Invention

This invention relates to guidance systems for aircraft, and more particularly to a system for producing range information for use in decelerating an aircraft along a known angle of descent. The invention is particularly useful in vertical take-off and landing (VTOL) and vertical/short take-off and landing (V/STOL) aircraft.

2. Description of the Prior Art

An aircraft's desired descent path during landing is usually defined by a radio beam or "glideslope beam." If the aircraft deviates from the glideslope beam, error signals are produced to assist the pilot in maneuvering the aircraft back to the desired descent path. The glideslope beam is initially acquired at a preselected altitude and range from the landing site, and range information is used for initially capturing and descending along the glideslope beam. In the past, longitudinal distance-measuring equipment such as DME or TACAN facilities or a Doppler computer have been used for measuring range or its equivalent. The accuracy and quality of the range signal produced by distance-measuring equipment of this type have been satisfactory for long range measurements, but for short range measurements the signal produced by such equipment is generally unreliable.

SUMMARY OF THE INVENTION

Briefly, this invention provides a system for controlling the deceleration of an aircraft as a function of the aircraft's range to the landing site. The invention contemplates use of an altitude sensing device to provide instantaneous measurements of the aircraft's altitude for determining the aircraft's instantaneous range to touchdown, based on a known angle. The descent angle can be a fixed angle, such as that defined by a conventional glideslope beam, or it can be a variable descent path, so long as an instantaneous value of the aircraft's descent angle is known. Utilization means responsive to range information are then used to control the deceleration of the aircraft. The use of sensed altitude information to determine aircraft range is important because altitude sensing devices provide accurate, high quality measurements at low as well as high altitudes. Thus, derived short range information is accurate. System operation is independent of longitudinal distance-measuring equipment, which is ordinarily incapable of producing accurate short range information. Further, the capability of initiating deceleration at an accurately measured preselected range is provided.

The present invention can be adapted to use aircraft range information to command a systematic reduction in the aircraft's speed as it decelerates along a known descent angle. For example, the derived range information can be used in conjunction with a preselected speed reduction schedule to command a reduction in the aircraft's airspeed or horizontal speed as range to touchdown approaches zero. Alternatively, the derived range information can be used to reduce one or more desired speed commands to zero during deceleration. When used to decelerate a VTOL or V/STOL aircraft, the invention is capable of commanding deceleration to hover at a given range and altitude or commanding deceleration to some minimum speed.

In a preferred form of the invention, the derived range information is used to command a speed reduction for deceleration along a preselected fixed descent angle, such as that defined by a glideslope beam. Assuming accurate lateral path control, the instantaneous measurement of aircraft altitude along the fixed descent angle is used in conjunction with the cosecant of the descent angle to produce signals representative of aircraft slant range from the landing site. As range decreases, a linearly dependent reduction in speed is commanded. Slant range information is preferably used to control the speed reduction; however, control by ground range information is an acceptable alternative to slant range for relatively small descent angles.

The preferred form of the invention is particularly useful in VTOL and V/STOL aircraft because it can be used to decrease the pilot's task load during landing. In VTOL and V/STOL aircraft the pilot is presented with the heaviest workload during low speed flight. He must exercise control over more variables than in a fixed-wing, conventional aircraft. The preferred form of the invention provides a deceleration capability for the terminal area near ground using automatic flight control system collective to monitor the fixed angle of descent. The system then commands a deceleration schedule referenced to the pitch cyclic control only. That is, as range decreases along the fixed descent slope, a speed reduction is commanded via utilization means in the form of the pitch cyclic command display of the VTOL or V/STOL aircraft, and the pilot is not required to exercise manual control over the collective control. Thus, the pilot's task load is decreased. This form of the invention can be adapted to command deceleration along a variety of final descent angles, and to initiate deceleration at a variety of ranges. Furthermore, the magnitude of the aicraft's deceleration can be adjusted to vary mission time.

BRIEF DESCRIPTION OF THE DRAWINGS

The features of specific embodiments of the best mode contemplated of carrying out the invention are illustrated in the drawings, in which:

FIG. 1 is a block diagram showing the basic operation of the guidance system of this invention;

FIG. 2 is a diagram of the vertical descent path geometry contemplated by this invention;

FIG. 3 is a block diagram showing the operation of a preferred system for generating a speed reduction schedule as a function of aircraft range.

DETAILED DESCRIPTION OF THE SPECIFIC EMBODIMENTS

Figure 4:
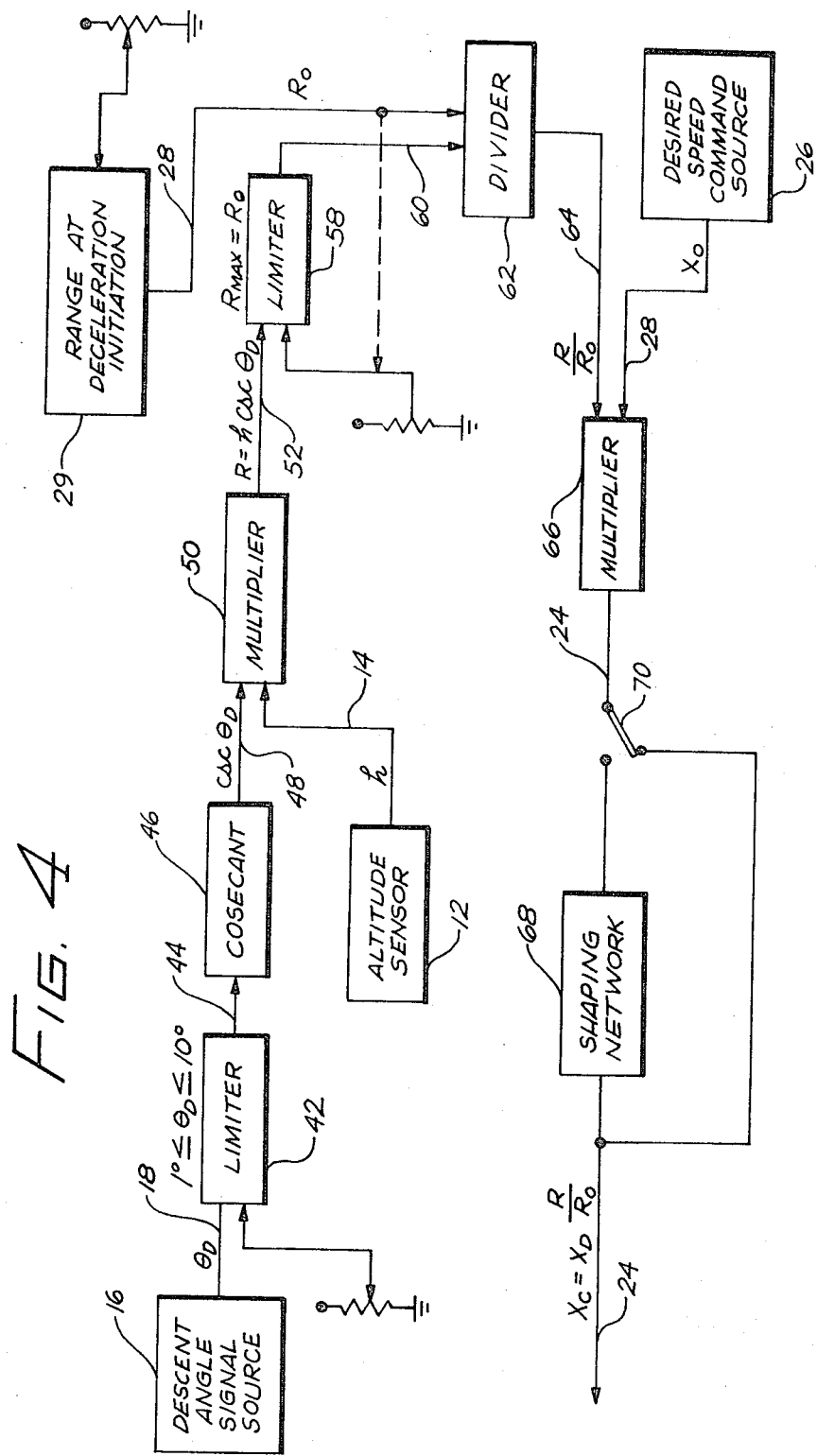
FIG. 4 is a block diagram showing the operation of a preferred system of function generators for generating a speed reduction schedule as a function of aircraft range.

Referring to the drawings, a slant range signal generator 10 receives instantaneous aircraft altitude information from an altitude sensor 12. Preferably, altitude sensor 12 comprises a radar altimeter which produces an electrical output signal 14 having a magnitude $h$ representing the absolute altitude of the aircraft above the landing site runway X', as illustrated in FIG. 2. Slant range signal generator 10 also receives descent angle information from a descent angle signal source 16. Signal source 16 produces an output signal 18 having a magnitude $\theta_D$ representing the aircraft's instantaneous angle of descent. As shown in FIG. 2, angle of descent $\theta_D$ is preferably defined as the angle between the true horizontal plane X and velocity vector V of the aircraft mass center M. As the aircraft decelerates along a descent slope defined by descent angle $\theta_D$, aircraft velocity vector V intercepts the runway X' at a target point T. The target point can be at a predetermined elevation above the runway, if desired. The representation of descent angle $\theta_D$ herein is equivalent to that typically used in the art to define aircraft "flight path angle." It is to be understood, however, that the term "angle of descent" refers generally to the slope of the descent path along which the aircraft is decelerating, and that other aircraft parameters related to "angle of descent," such as "pitch angle" or "angle of attack," for example, may in some circumstances be used as input parameters to slant range signal generator 10 without departing from the scope of the invention.

Slant range signal generator 10 produces a signal 20 having a magnitude R representing the aircraft's slant range from target point T. Preferably, slant range signal generator 10 includes a system of signal processing means responsive to aircraft altitude above the runway for trigonometrically computing slant range based on known descent angle $\theta_D$. For descent angle information as defined in FIG. 2, slant range R to touchdown is determined by the relationship $R = h \csc\theta_D$.

Slant range signal 20 is used in conjunction with aircraft utilization means for controlling the descent of the aircraft. FIG. 1 shows a preferred arrangement for using slant range signal 20, wherein a speed reduction schedule generator 22 responsive to signal 20 produces a speed command signal 24 having a magnitude $\dot{X}_c$. Preferably, speed command signal 24 commands a reduction in aircraft speed as the aircraft's slant range to touchdown decreases during deceleration. Speed reduction schedule generator 22 can include signal processing means such as a preselected speed reduction schedule for providing speed commands $\dot{X}_c$ in accordance with variations in slant range signal 20. Alternatively, speed reduction generator 22 can include a system of signal processing means or function generators responsive to desired speed command information, as illustrated in FIG. 3. Preferably, a desired speed command source 26 provides a desired speed command signal 27 having a magnitude $\dot{X}_D$. Signal 27 is fed to speed reduction schedule generator 22 along with slant range signal 20 and an output signal 28 from an adjustable deceleration initiation signal source 29. The magnitude $R_O$ of signal 28 represents the pilot-selected slant range at which deceleration is initiated. Desired speed command $\dot{X}_D$ can be the desired horizontal speed or the desired airspeed of the aircraft. As the aircraft's range to touchdown decreases from initial slant range $R_O$, speed command signal 24 commands a deceleration along the aircraft's descent path by progressively reducing desired speed command signal 27 to zero. As shown in FIG. 3, speed command signal 24 commands a linearly dependent reduction in speed; however, a linear speed reduction need not be commanded, for example, if flight is along a nonlinear descent path.

Speed command signal 24 is fed to one of a variety of aircraft utilization means 30 for controlling the deceleration of the aircraft. For example, by placing a switch 32 in an alternative position from that shown in FIG. 1, signal 24 may be fed to an instrument panel display, such as the pitch cyclic display on a VTOL aircraft. The pitch cyclic display provides information for controlling movements of the cyclic pitch control of the aircraft. The operation of the cyclic pitch control is well known. It controls the forward, backward, and lateral movement of the aircraft by varying the pitch of the rotor blades during each rotation cycle. Alternatively, placement of switch 32 as shown in FIG. 1 passes speed command signal 24 to a summing device 34 for comparison with an output signal 36 from an actual aircraft speed source 38. Output signal 36 has a magnitude $\dot{X}_A$ representing the actual vector speed of the aircraft. $\dot{X}_A$ may alternatively represent the actual horizontal speed of the aircraft. A speed error signal 40 having a magnitude $\Delta\dot{X}$ is produced by summing device 34. Speed error signal 40 represents the deviation of actual aircraft speed from commanded speed, and the resultant speed error signal 40 is fed to utilization means 30, such as an instrument panel display or an automatic flight control system.

The control system of this invention is more fully understood in the context of the following example in which the aircraft is assumed to decelerate along a fixed descent angle $\theta_D$ of 3°. As discussed previously, the fixed descent angle is ordinarily defined by a glideslope beam. Assuming that deceleration is initiated when the aircraft's slant range $R_O$ along the 3° descent angle is 3,800 feet, then the initial deceleration altitude $h_O$ is approximately 199 feet, as determined from the relationship
$$R_O = h_O \csc\theta_D.$$
Thus, deceleration begins when altitude sensor 12 produces an output signal 14 having a magnitude representing an altitude of 199 feet. Assuming that the aircraft is flying at a desired speed $\dot{X}_D$ of 125 knots per hour (212 feet per second) at the initiation of deceleration, the average desired speed $\dot{\bar{X}}_D$ (along the linear descent angle) from range $R_O$ to touchdown is 106 feed per second. At any time during deceleration, the commanded reduced speed $\dot{X}_c$ is derived from the instantaneous altitude and descent angle information in accordance with the relationship
$$\dot{X}_c = (R/R_O)\dot{X}_D$$
where $R = h \csc\theta_D$. Thus, at a slant range $R$ of 950 feet and an altitude of approximately 49.7 feet,
$$\dot{X}_c = (950/3,800) \times 212 = 53 \text{ ft/sec.}$$
Mission time $t$ for the aircraft is determined by the relationship
$$t = R_O/\dot{\bar{X}}_D,$$
and in the example problem,
$$t = 3,800/106 = 35.9 \text{ seconds.}$$
Average deceleration $\bar{a}$ from the desired speed $\dot{X}_D$ to zero speed is determined from the relationship
$$\bar{a} = \dot{X}_D/t,$$
and in the example problem,
$$\bar{a} = 212/35.9 = 5.9 \text{ ft/sec}^2.$$
Starting at a lower desired speed $\dot{X}_D$, for example, gives a longer mission time $t$ and a lower average deceleration $\bar{a}$. If the aircraft of the example problem is a VTOL or V/STOL aircraft, deceleration along a constant descent angle $\theta_D$ can be maintained using automatic flight control system collective to steer the aircraft to the glideslope beam which defines the descent angle. Starting at a preselected range $R_O$, a linearly dependent reduction in speed is commanded via the pitch cyclic command display, and a controlled deceleration is produced using the pitch cyclic control exclusively.

FIG. 4 shows a preferred system for generating speed commands in accordance with the above-described example problem. The system includes descent angle signal source 16 and altitude sensor 12 for respectively producing descent angle signal 18 and altitude signal 14. Signal 18 is passed through an adjustable limiter 42 for limiting the magnitude of an output signal 44 therefrom to a predetermined maximum and minimum. Preferably, limiter output signal 44, which represents descent angle $\theta_D$, is limited to values between 1° and 10°. Output signal 44 is fed to a cosecant function generator 46 which produces an output signal 48 proportional to the cosecant of descent angle $\theta_D$. The descent angle is limited to the above-mentioned values so that the cosecant of the descent angle is a relatively linear function which does not attain excessively large magnitudes.

A multiplier 50 receives output signal 48 and altitude signal 14 and produces an output signal 52 proportional to the product of signals 48 and 14. Output signal 52 represents the instantaneous magnitude of slant range R, which equals $h \csc\theta_D$. As discussed previously, deceleration initiation signal source 28 produces output signal 29 having a magnitude $R_O$ proportional to aircraft slant range at the initiation of deceleration. Deceleration initiation signal 28 is adjustable to provide a signal representing the particular pilot-selected slant range at which deceleration is initiated. Range signal 52 is passed through an adjustable limiter 58 which limits the magnitude of an output signal 60 therefrom to the value of the selected slant range $R_O$ at deceleration initiation. Signals 28 and 60 are fed to divider 62 which produces an output signal 64 proportional to the ratio of signal 60 to signal 28. A multiplier 66 receives divider output signal 64 along with output signal 28 from desired speed command source 26. Multiplier 66 produces output signal 24 which is proportional to the product of signals 64 and 28. Signal 24 represents commanded reduced speed $\dot{X}_c$, which equals $\dot{X}_D (R/R_O)$. Thus, when the preselected range-altitude combination is reached, a deceleration along the descent path is commanded by reducing the desired speed command to 0. Alternatively, speed command signal 24 can be routed through a shaping network 68 by placing a switch 70 in the position shown in FIG. 4. The shaping network commands deceleration to hover at a given range and altitude relative to target point T, as illustrated by the broken line in the range-speed command characteristic shown in FIG. 3.

It is to be understood that the aircraft guidance system of this invention can be adapted for use during any vertical-plane operating mode using a deceleration as a function of slant range or ground distance to a landing site without departing from the scope of this invention. It is not intended to be limited to deceleration commands relative to a constant descent angle, and it is capable of being adapted to any vertical-plane mode which employs a desired speed command.

I claim:
1. A system for guiding an aircraft during its approach to a preselected target point comprising:
   a. means for producing a signal representative of the aircraft's instantaneous angle of descent relative to the target point;
   b. altitude sensing means for measuring the instantaneous altitude of the aircraft relative to the target point and producing a signal representative of said sensed altitude;
   c. means responsive to the angle of descent signal and the sensed altitude signal for computing a signal representative of the aircraft's instantaneous slant range from the target point; and
   d. aircraft utilization means for controlling the aircraft's approach to the target point in response to variations in the slant range signal.

2. A guidance system according to claim 1 wherein the angle of descent signal represents the cosecant of the actual angle of descent of the aircraft.

3. A guidance system according to claim 1 wherein the aircraft's angle of descent is the angle between true horizontal and the longitudinal path from the aircraft to the target point.

4. A guidance system according to claim 1 wherein the aircraft's angle of descent is a preselected constant angle defined by a conventional glideslope facility.

5. A guidance system according to claim 1 wherein the altitude sensing means includes a radar altimeter.

6. A guidance system according to claim 1 wherein the utilization means comprises pitch cyclic control means for a VTOL or V/STOL aircraft.

7. A system for guiding an aircraft during its approach to a preselected target point comprising:
   a. means for producing a signal representative of the aircraft's instantaneous range from the target point;
   b. means responsive to the range signal for producing a signal representative of commanded aircraft speed; and
   c. aircraft utilization means for controlling the aircraft's approach speed in response to variations in the aircraft speed command signal.

8. A guidance system according to claim 7 wherein the aircraft speed command signal represents commanded horizontal speed.

9. A guidance system according to claim 7 wherein the aircraft speed command signal represents commanded vector speed.

10. A guidance system according to claim 7 including means for producing a signal representative of actual aircraft speed, and summing means responsive to the aircraft speed command signal and the actual aircraft speed signal for producing a speed error signal proportional to the algebraic difference between said signals; and wherein said utilization means is responsive to the speed error signal produced.

11. A guidance system according to claim 7 including a shaping network responsive to the speed command signal for adjusting the magnitude of said signal relative to the magnitude of the range signal.

12. A guidance system according to claim 7 wherein the utilization means comprises pitch cyclic control means for a VTOL or V/STOL aircraft.

13. A guidance system according to claim 7 including means for producing a signal representative of desired aircraft speed; and wherein the means for producing said aircraft speed command signal is additionally responsive to the desired aircraft speed signal.

14. A guidance system according to claim 13 which further includes means for producing a signal $R_0$ representative of the range at which aircraft descent is initiated, and adjustable limit means responsive to the range signal limiting the magnitude of the range signal to the magnitude of the signal $R_0$; and wherein the means for producing said aircraft speed command signal is additionally responsive to the signal $R_0$ for producing an aircraft speed command signal $\dot{X}_c$ which varies in accordance with the relation $\dot{X}_c = \dot{X}_D (R/R_0)$, where $\dot{X}_D$ represents the desired aircraft speed, and $R$ represents the aircraft's range from the target point.

15. A guidance system according to claim 13 which further includes:
   a. means for producing a signal representative of the preselected range at which aircraft descent is initiated; and
   b. adjustable limiting means responsive to the range signal for limiting the magnitude of the range signal to the magnitude of the signal $R_0$; and wherein the means for producing said aircraft speed command signal comprises:
      1. a divider responsive to a first input and a second input for producing an output signal proportional to the ratio of the first input to the second input;
      2. means for connecting the output of the limiting means to the first input of the divider;
      3. means connecting the descent initiation range signal to the second input of the divider;
      4. a second multiplier responsive to a first input and a second input for producing an output signal proportional to the product of the first and second inputs;
      5. means connecting the output signal from the divider to the first input of the second multiplier; and
      6. means connecting the desired aircraft speed signal to the second input of the second multiplier, the output signal of the second multiplier being representative of commanded aircraft speed.

16. A guidance system according to claim 13 wherein the aircraft speed command signal represents a systematic reduction in the magnitude of the desired aircraft speed signal in accordance with the corresponding reduction of the range signal as the aircraft approaches the target point.

17. A guidance system according to claim 16 wherein the aircraft speed command signal represents a linear reduction in the magnitude of the desired aircraft speed signal.

18. A guidance system according to claim 7 including:
   a. means for producing a signal representative of the aircraft's instantaneous angle of descent; and
   b. altitude sensing means for producing a signal representative of the aircraft's instantaneous altitude, the means for producing said range signal being responsive to the angle of descent signal and the altitude signal; and wherein said range signal has a magnitude $R$ which varies in accordance with the relation $R = h \csc\theta_D$, where $h$ represents the altitude of the aircraft, and $\csc\theta_D$ represents the cosecant of the angle of descent.

19. A guidance system according to claim 18 wherein the means for producing said range signal comprises:
   a. a function generator responsive to an input for producing an output signal proportional to the cosecant of the input;
   b. means for connecting the angle of descent signal to the input of the function generator;
   c. a first multiplier responsive to a first input and a second input for producing an output signal proportional to the product of the first and second inputs;
   d. means for connecting the output signal from the first signal processing means to the first input of the first multiplier; and
   e. means for connecting the altitude signal to the second input of the first multiplier, the output signal from the first multiplier being representative of the instantaneous range of the aircraft from the target point.

20. A method of guiding an aircraft during its approach to a preselected target point, with the aid of an altitude measuring system, the method comprising the steps of producing a signal representative of the aircraft's instantaneous angle of descent relative to the target point; measuring the instantaneous altitude of the aircraft with the altitude measuring system and producing therefrom a signal representative of the instantaneous sensed altitude of the aircraft relative to the target point; computing a signal representative of the aircraft's instantaneous slant range from the target point, the slant range signal at any instant being representative of the product of the sensed altitude signal and the angle of descent signal; and controlling the aircraft's approach to the target point in response to variations in the slant range signal.

21. The method according to claim 20 in which the slant rang signal is computed from the product of the altitude of the aircraft and the cosecant of the descent angle of the aircraft.

22. A method of guiding an aircraft during its approach to a preselected target point, the method comprising the steps of producing a signal representative of the aircraft's instantaneous range from the target point, generating from said range signal a signal representative of commanded aircraft speed, and controlling the aircraft's approach speed in response to variations in the aircraft's speed command signal.

23. A method according to claim 22 including the steps of producing a signal representative of the aircraft's instantaneous angle of descent, measuring the aircraft's instantaneous altitude and producing a signal representative of the aircraft's instantaneous sensed altitude, and computing said range signal by taking the product of the sensed altitude signal and the cosecant of the angle of descent signal.

* * * * *